United States Patent
Yehezkel et al.

(10) Patent No.: US 8,743,205 B2
(45) Date of Patent: Jun. 3, 2014

(54) SYSTEM AND METHOD FOR SEMANTIC VIDEO CONTENT ANALYSIS

(75) Inventors: Raanan Yonatan Yehezkel, Kiryat Ekron (IL); Guy Blumstein-Koren, Tel Mond (IL); Yaniv Gurwicz, Givataim (IL)

(73) Assignee: Nice Systems Ltd., Raanana (IL)

( * ) Notice: Subject to any disclaimer, the term of this patent is extended or adjusted under 35 U.S.C. 154(b) by 324 days.

(21) Appl. No.: 13/206,851

(22) Filed: Aug. 10, 2011

(65) Prior Publication Data

US 2013/0038737 A1    Feb. 14, 2013

(51) Int. Cl.
H04N 7/18 (2006.01)
G11B 27/28 (2006.01)
G08B 13/196 (2006.01)
H04N 5/247 (2006.01)

(52) U.S. Cl.
CPC .......... *G11B 27/28* (2013.01); *B08B 13/19645* (2013.01); *G08B 13/19693* (2013.01); *H04N 7/181* (2013.01); *H04N 5/247* (2013.01)
USPC ............................ 348/159; 348/160; 382/236

(58) Field of Classification Search
CPC ............. G11B 27/28; G08B 13/19645; G08B 13/19693; H04N 7/181; H04N 5/247
USPC ....................................................... 348/159
See application file for complete search history.

(56) References Cited

U.S. PATENT DOCUMENTS

| | | | |
|---|---|---|---|
| 5,854,902 A * | 12/1998 | Wilson et al. | 709/247 |
| 5,875,304 A * | 2/1999 | Winter et al. | 709/231 |
| 5,917,958 A * | 6/1999 | Nunally et al. | 382/276 |
| 5,974,235 A * | 10/1999 | Nunally et al. | 709/202 |
| 6,031,573 A * | 2/2000 | MacCormack et al. | 375/240.16 |
| 6,144,797 A * | 11/2000 | MacCormack et al. | 386/224 |
| 7,236,690 B2 * | 6/2007 | Matsukawa | 386/223 |
| 8,204,955 B2 * | 6/2012 | McBride et al. | 709/217 |
| 8,457,401 B2 * | 6/2013 | Lipton et al. | 382/173 |
| 8,564,661 B2 * | 10/2013 | Lipton et al. | 348/143 |
| 2004/0223054 A1 * | 11/2004 | Rotholtz | 348/143 |
| 2006/0013473 A1 * | 1/2006 | Woodfill et al. | 382/154 |
| 2006/0072014 A1 * | 4/2006 | Geng et al. | 348/159 |
| 2006/0171453 A1 * | 8/2006 | Rohlfing et al. | 375/240.01 |
| 2007/0024707 A1 * | 2/2007 | Brodsky | 348/143 |
| 2007/0279494 A1 * | 12/2007 | Aman et al. | 348/169 |
| 2008/0270569 A1 * | 10/2008 | McBride et al. | 709/217 |
| 2009/0136091 A1 * | 5/2009 | Woodfill et al. | 382/106 |
| 2010/0195913 A1 * | 8/2010 | Sharma et al. | 382/190 |
| 2012/0001755 A1 * | 1/2012 | Conrady | 340/540 |

* cited by examiner

*Primary Examiner* — Andy Rao
*Assistant Examiner* — Shan Elahi
(74) *Attorney, Agent, or Firm* — Pearl Cohen Zedek Latzer Baratz LLP (57) ABSTRACT

Embodiments of the invention may include generating a description of a monitored scene and creating a plurality of rules related to the monitored scene by using common language. The description of the monitored scene and the plurality of rules may be converted into system parameters and an analysis of the video data may be performed based on the system parameters. The results of the analysis may be converted into one or more output terms from the plurality of predefined terms and may be displayed to a user in a common language.

18 Claims, 7 Drawing Sheets

SYSTEM AND METHOD FOR SEMANTIC VIDEO CONTENT ANALYSIS

BACKGROUND

Video Content Analysis (VCA) or video analytics are the common names for automatic analysis of a video stream to detect or identify points of interest in the video stream. Video analytics is becoming more prevalent in a wide range of domains such as security, entertainment, health care and surveillance. Some VCA systems include a large number of cameras, and may analyze multiple video channels. Setting up and configuring such a VCA system may become a complicated operation which is usually performed by an experienced system administrator. A system administrator is required to be familiar with both the VCA system and the monitored environment in order to set up a VCA system properly.

A user of the VCA system, for example, a security person may usually have a deep knowledge of the monitored environment. However such a user may lack the knowledge or the technical capabilities of setting up and configuring such a VCA system. This may lead to an undesired situation in which only a certified system administrator can set up or configure a VCA system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification and claims to describe two or more components, devices, elements, units, parameters, or the like. For example, "a plurality of devices" may include two or more devices.

Although embodiments of the invention are not limited in this regard, the term "camera" as used herein may be used throughout the specification and claims to describe any device or component able to capture and/or record any type of data, such as, video data, still images data, audio data and the like Some embodiments of the invention may be implemented, for example, using an article including or being a non-transitory machine-readable or computer-readable storage medium, having stored thereon instructions, that when executed on a computer, cause the computer to perform method and/or operations in accordance with embodiments of the invention. The computer-readable storage medium may store an instruction or a set of instructions that, when executed by a machine (for example, by a computer, a mobile device and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Video Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Embodiments of the invention are directed to a method and system for semantics based video analysis. A user may enter information after being presented with a monitored scene (e.g., a view captured by a camera), to generate a description of the monitored scene. A user may be presented with a video or moving image view of the scene, and then may select a still image from the scene for information entry. The user may generate a description of the monitored scene by selecting one or more words or terms from a plurality of predefined terms. The user may enter or create a plurality of rules related to the monitored scene, possibly by using one or more words or terms from a plurality of predefined terms, e.g., by using a common language. The description of the monitored scene and the rules may be converted into a plurality of video characterization parameters and an analysis of video data (e.g., future video data received) may be performed based on the parameters and the rules. The results of the analysis may be converted into one or more alerts selected from a plurality of predefined alerts and may be displayed or presented to a user in a common language which he can easily understand. According to some embodiments of the invention, information input by a user used to characterize objects in a scene may be used by an automatic process to characterize similar or the same objects when viewed in another scene.

Figure 1:
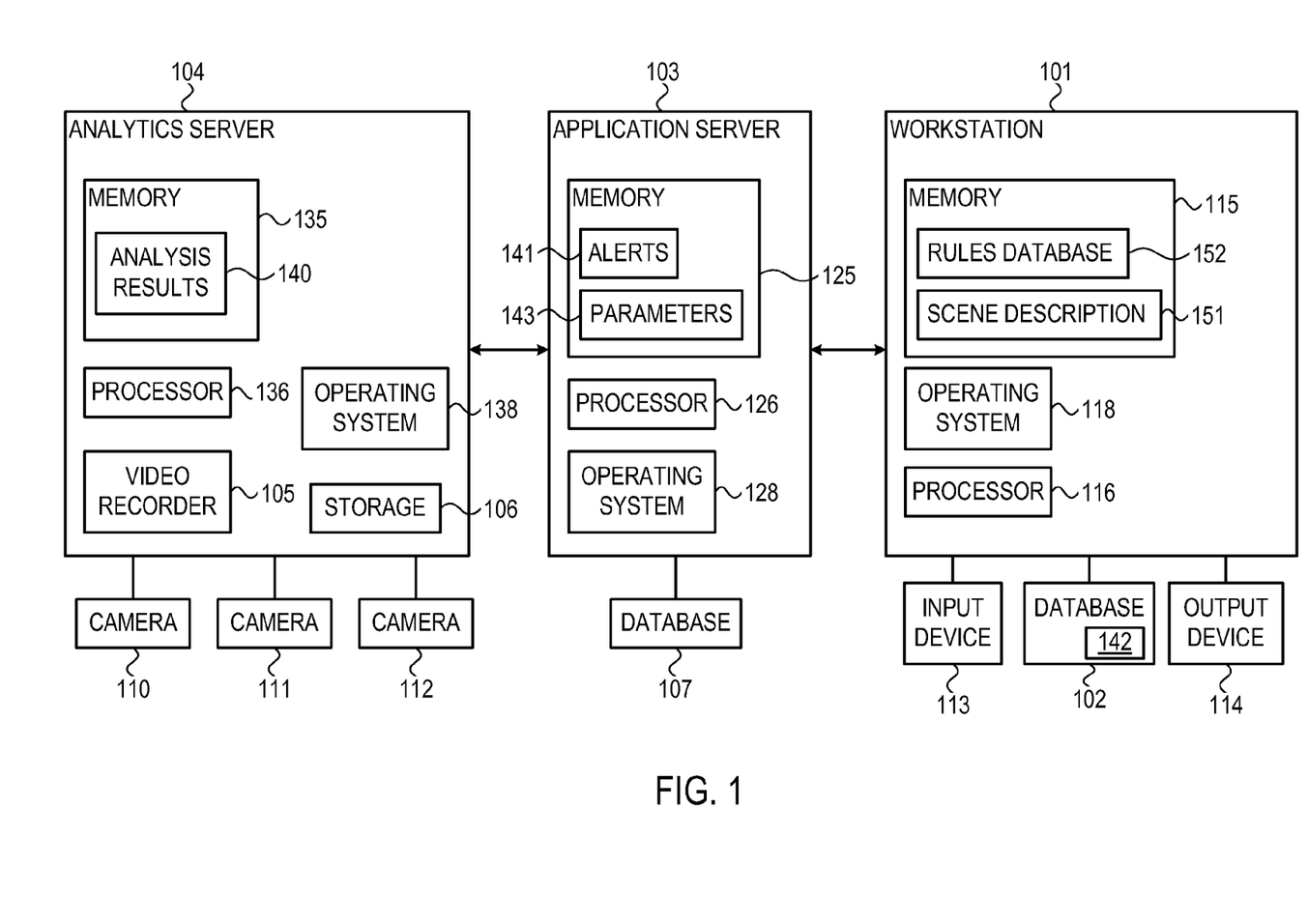
FIG. 1 is a high-level block diagram of a video analytics system according to embodiments of the present invention.

Reference is now made to FIG. 1, which is a high-level block diagram of a video analytics system according to embodiments of the present invention. Although the scope of the present invention is not limited in this respect, video analytics system 100 may allow a user to use intuitive, common or spontaneous language or set of provided terms in order to set up system 100, and to receive video analytics results described with the same intuitive common language or set of provided terms. Video analytics system 100 may include one or more cameras 110, 111 and 112 connected to an analytics server 104 which may be connected to or integrated with application server 103. Analytics system 100 may include a workstation 101 connected to or integrated with application server 103, for example, via a LAN network. Workstation 101, application server 103, and analytics server 104, or the functionality provided by each of these units, may be divided among different storage, processing or computing units in different embodiments. For example, one computer or workstation may combine workstation 101, application server 103, and analytics server 104 or their functionality.

Workstation 101 may include a memory 115, a processor 116 and an operating system 118. Workstation 101 may include, be connected to or integrated with database 102, input device 113 and output device 114. Processor 116 may be, for example, a central processing unit processor (CPU), a chip or any suitable computing or computational device. Operating system 118 may be or may include any code segment designed and/or configured to perform tasks involving coordination, scheduling, arbitration, supervising, controlling or otherwise managing operation of workstation 101, for example, scheduling execution of programs. Memory 115 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 115 may be or may include a plurality of, possibly different memory units. Memory 115 may include executable code, e.g., an application, software, a program, a process, task or script, to perform some or all of the methods described herein. The executable code may be executed by processor 116 possibly under control of operating system 118.

Input devices 113 may be or may include a mouse, a keyboard, a touch screen or pad or any suitable input device. It will be recognized that any suitable number of input devices may be operatively connected to workstation 101. Output devices 114 may include one or more displays, monitors, speakers and/or any other suitable output devices. It will be recognized that any suitable number of input devices and/or output devices may be operatively connected to any number of workstation 101. Any applicable input/output (I/O) devices may be connected to workstation 101. For example, a network interface card (MC), a printer or facsimile machine, a universal serial bus (USB) device or external hard drive may be included in input devices 113 and/or output devices 114.

According to embodiments of the invention, a user, operating workstation 101, may accept a description of a monitored scene and a plurality of rules described using intuitive language, e.g., words, terms or phrases from a plurality of predefined words, terms or phrases saved in database 102, in order to set up system 100. Dedicated software, such as a graphical user interface (GUI), may be saved in memory 115, executed by workstation 101 and may allow the user to set up system 100 by using intuitive language as described in embodiments of the invention. The user may use or select one or more words, terms or phrases from a plurality of predefined words, terms or phrases 142 saved in database 102 to generate a description 151 of a monitored scene which may be saved in memory 115. A monitored scene may be any real-world environment which may require video based applications implemented by one or more cameras placed to monitor the scene, e.g., one of cameras 110-112.

A description of a monitored scene may be generated by accepting, from a user, a descriptive word, phrase or term for each of a plurality of objects in a still image or a frame. For example, using a GUI, a still image representing a monitored scene may be displayed to a user. The user may use the GUI to select an object in the image and assign to the object a descriptive word, phrase or term from a plurality of predefined words, terms or phrases 142 saved in database 102 to generate a description 151 of a monitored scene which may be saved in memory 115. Using a GUI, a user may mark the boundaries of a selected object as its representation is displayed in the still image and may label it using a selected word or term, such as, "fence", "road" and the like. An exemplary GUI may include a plurality of buttons labeled with the plurality of the predefined words or terms or a "drop box" including the plurality of the predefined words or terms. Any other implementation of a GUI may be used. By pressing a button (e.g., a button in the GUI, using a pointing device such as a mouse), a user may mark an object and assign a descriptive word or term to it. For example, by pressing a button, a corresponding three-dimensional (3-D) object skeleton (including boundaries) may appear on or overlaying the image and the user may modify it to match the selected object in the image. For example a user may press a button named "fence", a 3-D skeleton of a fence may appear on the image and a user may move, stretch and rotate it such as to match a fence seen in the image. In such way an object in an image may be associated with a semantic label such as a "fence".

According to embodiments of the invention, a plurality of rules 152 related to the monitored scene or a plurality of events related to the monitored scene may be created or set by using one or more terms from the plurality of predefined terms and may be saved in memory 115. An event may be included in video data captured by one or more of cameras 110-112 and saved in memory 135 and may relate to an action that took place at the monitored scene, e.g., to a real-world action. Events that may occur in the monitored scene, which are captured and saved in memory 135, may include actions which are not allowed to happen or need to be prevented. Such events may be defined by creating a rule or an event that needs to be avoided (or where the real-world corresponding event should be avoided), for example, "crossing a fence". Workstation 101 may accept the description of the monitored scene (151) and the plurality of rules related to the scene (152) generated by a user using one or more words, terms or phrases from the plurality of predefined words or terms.

Application server 103 may receive from workstation 101 the semantic setup including the description of the monitored scene and the plurality of rules defined by the intuitive predefined words, terms or phrases. Application server 103 may convert description of the monitored scene into system parameters or video characterization parameters 143. Video characterization parameters may be used to tune and implement a plurality of computer vision algorithms used by the system such as, background modeling, object detection and tracking algorithms. Video characterization parameters may include a plurality of mathematical values required by computer vision algorithms representing, for example, statistical values, sizes, levels, coordinates, all being used during execution of a plurality of computer vision algorithms. Exemplary video characterization parameters may include, coordinates of segments boundaries, probability, mean and standard deviation of pixels luminance or color, scene perspective parameters, depth, expected velocity of tracked objects, expected acceleration of tracked objects, image characteristics used for tuning object detection parameters, e.g., standard deviation of pixel luminance over time. Video characterization parameters 143 may be saved in memory 125 and may be transferred to analytics server 104 for video analysis. Application server 103 may also receive analysis results 140 from analytics server 104, and may convert the analysis results 140, for example, events identified by analytics server 104, into triggers or/and alerts 141 in intuitive language. Triggers and/or alerts 141 may be saved in memory 125 and may be transferred to workstation 101 in order to be presented to a user operating workstation 101 in intuitive language.

Application server 103 may include a memory 125, a processor 126 and an operating system 128. Application server 103 may include, be connected to or integrated with database 107. Processor 126 may be, for example, a central processing unit processor (CPU), a chip or any suitable computing or computational device. Operating system 128 may be or may include any code segment designed and/or configured to perform tasks involving coordination, scheduling, arbitration, supervising, controlling or otherwise managing operation of application server 103, for example, scheduling execution of programs. Memory 125 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 125 may be or may include a plurality of, possibly different memory units. Memory 125 may include executable code, e.g., an application, software, a program, a process, task or script. The executable code may be executed by processor 126 possibly under control of operating system 128 to perform some or all of the methods described herein.

Database 107 may be used for storing any data related to the conversion of the intuitive semantic setup into video characterization parameters and any data related to the conversion of identified events into triggers and/or alerts, for example, video characterization parameters, system parameters, system rules or any other suitable data. Database 107 may be stored in any suitable memory units or storage medium. In some embodiments of the present invention, database 107 may be located inside application server 103 while in other embodiments, database 107 may be located outside application server 103. In some embodiments of the invention database 107 and database 102 may be implemented as a single database while in other embodiments two separate databases may be implemented.

Cameras 110, 111 and 112 may be placed to monitor a scene and may be located or positioned at the monitored scene. Cameras 110, 111 and 112 may be, for example, a closed-circuit television system (CCTV) and may capture video data. The video data including a series of images captured by one or more of cameras 110, 111 and 112 may be transferred to video recorder 105 located within, integrated with or coupled to analytics server 104. Video recorder 105 may receive the video stream from cameras 110, 111 and 112 and may save the video data recorded by the plurality of cameras for the use of analytics server 104.

Analytics server 104 may receive video characterization parameters 143 from application server 103. The video characterization parameters may include parameters that may be used or required in order to tune or execute computer vision algorithms used by the system during video analysis such as, background modeling, object detection and tracking algorithms. Analytics server 104 may scan the video stream and may perform an analysis of the video data saved in video recorder 105 in order to identify events, actions or rule breaking based on the system parameters. Analytics server 104 may save analysis results 140, e.g., the identified events, in memory 135 and may transfer them to application server 103 which may convert the results of the analysis into alerts represented in intuitive language, e.g., one or more output words, terms or phrases from the plurality of predefined words, terms or phrases. The output alerts, words, terms or phrases may, for example, be displayed or presented to the user as triggers and/or alerts at workstation 101. The results of the analysis, e.g., alerts or triggers may be transferred to workstation 101 and may be presented, e.g., displayed to a user operating workstation 101 in intuitive language. For example, alerts like "an object crossed the road" or "an object approached the fence" may be presented as arrows indicating the direction of movement and speed of the object on a site map Analytics server 104 may include a storage unit 106 which may be used for storing data related to the video stream and to the analysis process, for example, the video characterization parameters 143 transferred from application server 103. In some embodiments of the present invention, storage unit 106 and video recorder 105 may be located externally to analytics server 104 while in other embodiments storage unit 106 and video recorder 105 may be implemented as a single storage unit. Storage unit 106 and video recorder 105 may be placed at any suitable memory units or storage medium.

Analytics server 104 may include a memory 135, a processor 136 and an operating system 138. Processor 136 may be, for example, a central processing unit processor (CPU), a chip or any suitable computing or computational device. Operating system 138 may be or may include any code segment designed and/or configured to perform tasks involving coordination, scheduling, arbitration, supervising, controlling or otherwise managing operation of analytics server 104, for example, scheduling execution of programs. Memory 135 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 135 may be or may include a plurality of, possibly different memory units. Memory 135 may include executable code, e.g., an application, software, a program, a process, task or script. The executable code may be executed by processor 136 possibly under control of operating system 138 causing the operation of some or all of the methods described herein.

In embodiments of the present invention, each of the databases 102, 107, 105 and 106 may be or may include, or may be stored in, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Video Disks (DVDs), a tape, a cassette, a universal serial bus (USB) device or other suitable removable and/or fixed storage unit.

Although in the exemplary illustration of FIG. 1, three cameras 110 111 and 112 and one analytics server, one application server and one workstation are shown, it should be understood to a person skilled in art that the invention is not limited in this respect and according to embodiments of the present invention, system 100 may include any suitable numbers of cameras and analytics servers, application servers and workstations or other computing devices.

Figure 2:
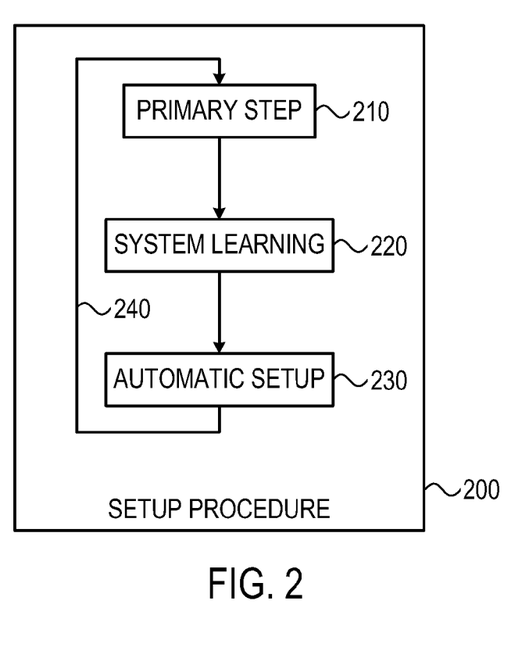
FIG. 2 is a flowchart of a configuration method of semantic video analytics system according to embodiments of the present invention.

Reference is now made to FIG. 2, which is a flowchart of a configuration method of a semantic video analytics system according to embodiments of the present invention. Operations of the method may be implemented, for example, using system 100, by one or more of the elements in system 100, for example, analytics server 104, application server 103, workstation 101 and/or by other suitable units, devices, and/or systems.

Video analytics system, for example, system 100 of FIG. 1 may require a setup procedure or configuration procedure. A configuration procedure or setup procedure 200 may be implemented once or a plurality of times according to the requirements of the video analytics system. For example, a configuration procedure of a video analytics system may include a semantic setup and an analysis rules setup, therefore set-up procedure 200 may be executed twice: a first time during semantic setup and a second time during analysis rules setup. A semantic setup may include setting, generating or creating a description of a monitored scene by using one or more words, terms or phrases from a plurality of predefined words, terms or phrases or a predefined list of words, terms or phrases. The semantic setup may provide a semantic description of a scene, an environment, a location a view or an event which may serve as an infrastructure for video analysis. An analysis rules setup may include setting, generating or creating a plurality of rules related to the monitored scene, e.g., related to objects or areas at the monitored scene, by using one or more words, terms or phrases from the plurality of predefined words or a predefined list of words. A set of rules or events may be described in relation to the description of the monitored scene and may instruct the system which events or objects need to be detected in the video data. An analysis rules setup may set or create the analysis rules that define the desired insights and instruct the system how to alert or notify the user in case specific events are detected.

According to embodiments of the invention, the setup procedure 200 may be performed on a still image presented to the user. A user may browse through a video stream and select the best image for him, e.g., an image that is visually clear where the objects needed to be segmented are visible. For example, the semantic setup may be performed by the system receiving user marking and labeling for a still image presented to the user and the analysis rules setup may be performed on a site map which is a global overview of the monitored environment as captured by a plurality of cameras located at the monitored environment.

Each of the configuration procedures or setup procedures, e.g., the semantic setup and the analysis rules setup may include three steps or stages: a primary setup stage, indicated at box 210, a system learning stage, indicated at box 220 and an automatic setup stage, indicated at box 230. These three stages may be executed successively and may be applied repeatedly, in a cyclic manner until a sufficient accuracy is achieved, e.g., a sufficient accuracy of a match between boundaries of an object in an image and the boundaries assigned to it by a user. During the semantic setup, a user may decide if a sufficient accuracy is achieved while during analysis rules setup, a user may decide if the rules defined are sufficient to cover the required insights of the scene. Other stages or numbers of stages may be used. The three stages indicated at boxes 210, 220 and 230 are presented herein with relation to the semantic setup. It should be understood that those stages may be performed during any setup procedures, for example, during analysis rules setup.

As indicated at box 210, the primary setup stage may include dividing or segmenting an image of a monitored scene, into a plurality of segments and labeling the plurality of segments by a human, e.g., a user of workstation 101. Labeling may be performed, for example, by a human using one or more words, terms or phrases from a plurality of predefined terms or by using words or terms from a predefined list of words or terms. The primary setup stage may be performed manually, e.g., by a user that may look at an image of a monitored scene or the site map and may use a predefined set of words in order to set a semantic description to areas, parts or objects on the map.

During a system learning stage, indicated at box 220, the system, e.g., a computing device, may learn the settings defined during the primary stage, for example, identify or learn characteristics of the labeled segments or objects. Characteristics such as appearance of the labeled segment, e.g., color, texture, geometric layout and the like may be identified by the computing device for use at the next stage.

As indicated at box 230, an automatic setup stage may be performed after the system learning stage. During this stage, the system may refine and complete the setup by suggesting one or more setup corrections, e.g., to the user, based on the characteristics identified at system learning stage indicated at box 220. The user then may decide whether to accept the suggestions or manually refine the setup by initiating the process again by performing primary setup stage again as indicated by arrow 240.

According to some embodiments of the invention, a setup procedure may be implemented on a multi-channel environment or system, e.g., a system which includes a plurality of video channels. Each channel may include video stream from one or more cameras. In an example multi-channel environment, primary setup stage 210 may first be executed on a first channel by segmenting or describing an image of a monitored scene captured by a first video stream using predefined words, terms or phrases. As indicated at box 220, the system may learn the settings or the setup of the first channel applied at box 210 and automatically set all other channels according to the first channel as indicated at box 230.

Figure 3:
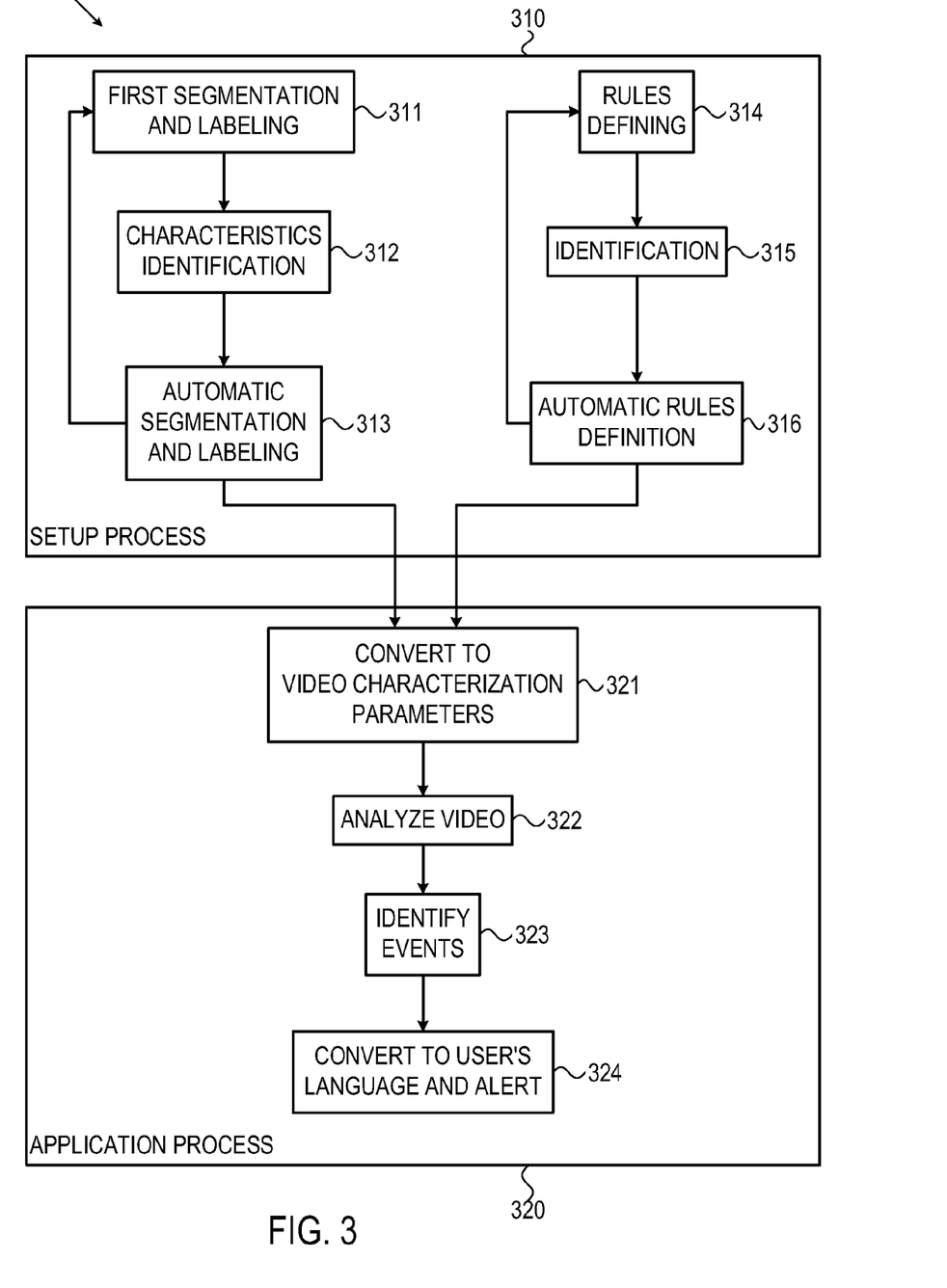
FIG. 3 is a flowchart describing a setup and application of a semantic video analytics system according to embodiments of the present invention.

Reference is now made to FIG. 3, which is a flowchart describing a setup and application of a semantic video analytics system according to embodiments of the present invention. Semantic based method 300 may include a setup process 310 and an application process 320. Setup process 310 may include one or more procedures or processes, e.g., a setup process which is described in boxes 311, 312 and 313 and a rules defining process which is described in boxes 314, 315 and 316. Setup process 310 may include or may follow a selection of a frame of a video stream representing an image of real-world scene, e.g. a monitored scene to be used during setup process 310. For example, a still image selected from a video stream may be presented to a user for labeling during semantic setup while during analysis rules setup a still image which includes a global overview of a monitored scene as captured by all the cameras situated at the monitored scene, also referred to herein as a "site map" may be used. In addition the setup procedure, e.g., analysis rules setup may include using text or voice.

According to embodiments of the invention, setup process 310 may include a first image segmentation and labeling process performed by a user and accepted by a computing device as a user input as indicated at box 311. An image of the monitored scene may be divided or segmented into a plurality of segments, areas or regions and each segment may be labeled using one or more words or terms from a plurality of predefined words or terms or a predefined vocabulary. The first segmentation and labeling process may be performed manually by a user operating a workstation of a video analytics system, e.g., system 100 of FIG. 1. A computing device, e.g., workstation 101 of FIG. 1 may receive or accept user input relating to the segmentation and labeling. The first image segmentation and labeling process may include a semantic interpretation of a scene which may provide an infrastructure for analyzing the video stream according to the rules provided, e.g., at box 314.

As the labeling of the segments is performed by using one or more words, terms or phrases from a plurality of predefined terms or words, the plurality of predefined words may include words, terms or phrases describing a predetermined set of objects which may be related or may be found in the monitored scene. The predetermined set of objects may correspond to a certain video analytics application and may include objects that are common in a scene typical for the certain video analytics application. For example, perimeter intrusion detection application may require a predefined set of words including, for example, "fence", "road", "vegetation" and the like.

Figure 4A:
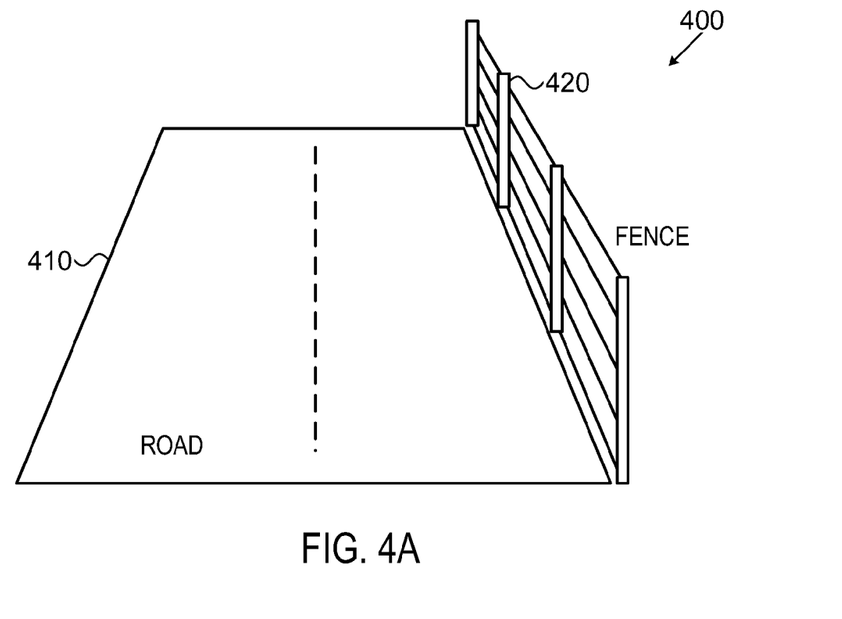
FIGS. 4A and 4B are graphical illustrations of scene segmentation and labeling according to embodiments of the present invention.
Figure 4B:
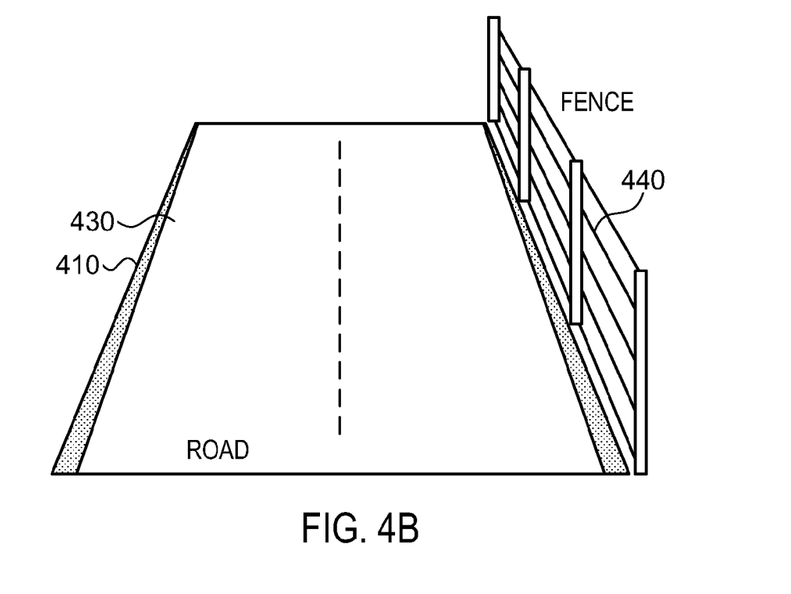
Figure 5A:
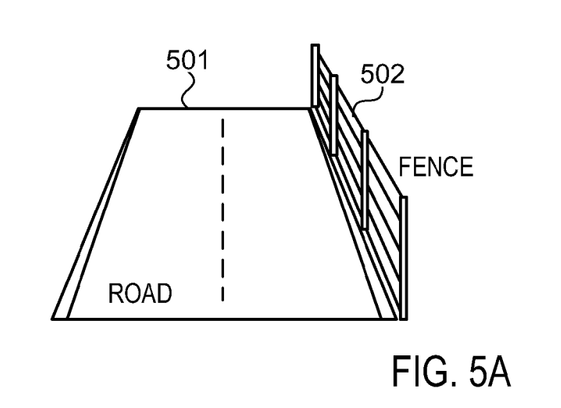
FIGS. 5A-5D are graphical illustrations of scene segmentation in four different video channels according to embodiments of the invention.
Figure 5B:
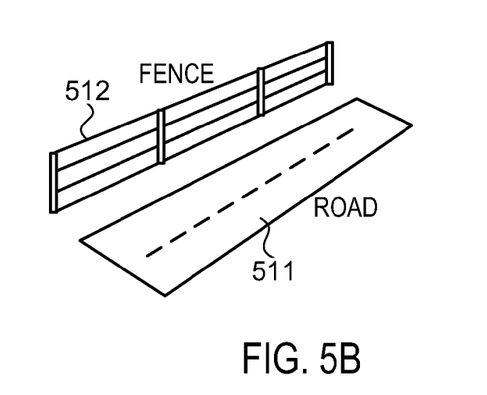
Figure 5C:
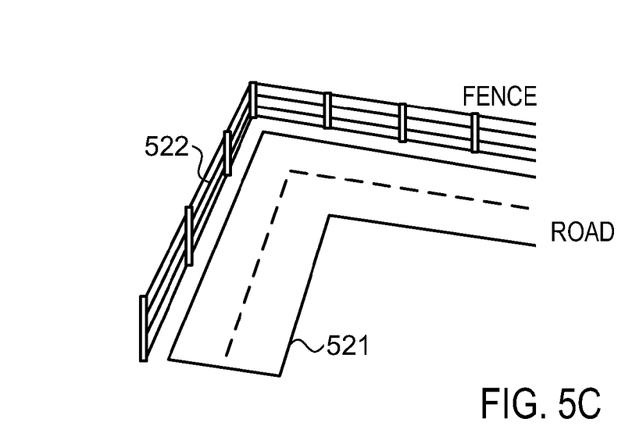
Figure 5D:
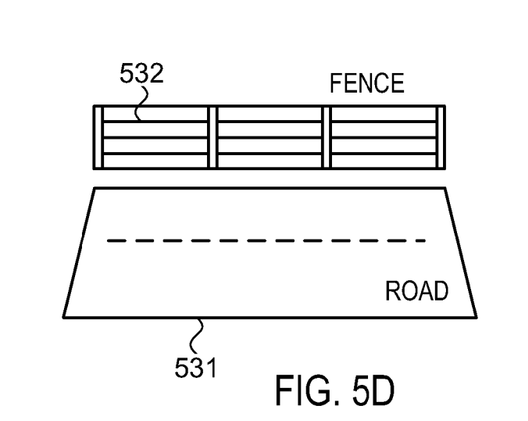

Reference is made now to FIGS. 4A and 4B which are graphical illustrations of scene segmentation and labeling according to embodiments of the invention. FIG. 4A shows a graphical illustration of an exemplary scene 400 typical for a perimeter intrusion detection application which is used as a site map. Scene 400 includes a road 410 and a fence 420. As shown by FIG. 4B, scene 400 may be segmented by a user using an input device such as a mouse or a keyboard into two segments. A first segment 430 may include the road and a second segment 440 may include the fence. A user may select a label from a plurality of predefined ordinary or common words to describe segment 430 as "road" and segment 440 as "fence". The notions "road" and "fence" may be identified, marked and labeled by a user without using any technical definitions.

Reference is made back to FIG. 3. According to embodiments of the invention, during first segmentation and labeling process, properties of objects segmented in the frame, such as geometric alignment in the 3D space may also be set. Such properties may describe an object either with respect to the scene or with respect to other objects. For example, a fence is usually perpendicular to a road. In some other cases it can be set to an angle other than 90 degrees, e.g., by a 3D rotation of the fence skeleton and boundaries. Another example is a fence crossing the field of view of the camera from left to right, perpendicular to the camera focal axis. A road can start at base of the image and end at a vanishing point, at the horizon, in some location on the image. In some embodiments, some properties may be learned directly from the label of the object. For example, an object which is labeled "road" may be a plane that is perpendicular to an object labeled "fence". However, such properties may be modified by a user.

As indicated at box 312, during setup process 310 the characteristics of the labeled segments or objects may be identified or learned by the computing device. Characteristics such as appearance of the labeled segment, e.g., color, texture, geometric layout and the like may be identified and saved by the computing device, e.g., identified by workstation 101 of FIG. 1 and saved in memory 115 of FIG. 1. For example, in FIG. 4B the texture of road 430 may be identified by a computing device and may be used for determining the edges of the actual segment marked as "road". The identified characteristics may be used during the automatic segmentation stage indicated at box 313.

As indicated at box 313, a second, automatic segmentation may be performed by the computing device during which the first segmentation of the image (box 311) may be refined, improved or corrected based on the characteristics identified during characteristics identification stage (box 312). The identified characteristics of each of the segments may be used to correct inaccuracies in the original first segmentation, e.g., the segmentation made by a user input. Exemplary inaccuracies which may occur in segmentations of objects may include, for example, inaccurate angle setting between objects in the 3D space or inaccurate depth estimation. An example of an inaccurate segmentation is presented in FIG. 4B.

Reference is made to FIG. 4B, in which the road segmentation is not accurate, e.g., the edges of the road as marked are not accurate as segment 430 is narrower than area 410 which its dotted area represents the real edges of the road itself. A fine tuning may be performed by a computing device, e.g., workstation 101 of FIG. 1 during automatic segmentation in order to refine and estimate borders, edges or margins of objects which are not clear in the image.

According to embodiments of the invention, during the first segmentation and labeling, indicated at box 311, objects in all video channels may be segmented by a user while in other embodiments objects may be segmented only in some of the video channels and the other video channels may be segmented during automatic segmentation indicated at box 313 based on the identified characteristics of object identified in other channels. Moreover, the user may choose not to mark all the objects in a certain channel as long as all the objects are marked at least once on other video channels of the system. For example, the user may choose to mark a "fence" and "vegetation" in a first video channel and mark a "road" in a second channel during first segmentation stage.

Reference is made now to FIGS. 5A-5D which are graphical illustrations of scene segmentation in four different video channels according to embodiments of the invention.

FIGS. 5A-5D represent selected frames of four different video channels of a certain analytics video system. According to embodiments of the invention, segmenting and labeling may be performed by a user on one channel only during first segmentation and labeling stage. For example, in FIG. 5A which shows a frame of channel "A", the objects "road" 501 and "fence" 502 may be segmented and labeled during first segmentation and labeling stage (box 311). The characteristics of areas 501 and 502 labeled "road" and "fence" may be learned by a computing device during characteristics identification stage (box 312) and during a second segmentation (box 313) an automatic search may be performed by the computing device on unlabeled channels "B", "C" and "D" represented by FIGS. 5B-5D, respectively, in order to find areas that may have similar features or characteristics as areas which were defined, marked and labeled on other channels by a user, e.g., channel "A". For example, object 511 of channel "B" (FIG. 5B), object 521 of channel "C" (FIG. 5C) and object 531 of channel "D" (FIG. 5D) may all be automatically segmented and labeled as "road" as they all have characteristics and features similar or substantially identical to object 501 of channel "A" (FIG. 5A) which was labeled as "road" by a user. Another example may include object 512 of channel "B" (FIG. 5B), object 522 of channel "C" (FIG. 5C) and object 532 of channel "D" (FIG. 5D), which may all be automatically segmented and labeled as "fence" as they all have characteristics and features similar or substantially identical to object 502 of channel "A" (FIG. 5A) which was labeled as "fence" by a user.

Referring to FIG. 3, setup process 310 may include rules defining process described in boxes 314, 315 and 316. As indicated at box 314, rules may be defined or set during rules defining stage. This stage may include setting a plurality of rules related to the monitored scene or defining a plurality of events to be detected at the monitored scene by using one or more words, terms or phrases from the plurality of predefined words, terms or phrases. The definitions of events, when stored in the system, may be data describing words which describe real-world events. The rules defining process may be performed by a user operating a workstation, for example, by graphical methods or by a method which allows setting up and configuring the entire system, e.g., by setting up a plurality of channels at once or setting up each channel separately.

Rules may describe a combination of events identified, e.g., textually and/or graphically which, if detected, produce an alert or an alarm. An example of a rule in textual form is "slow movement near the fence". This rule is defined by using natural language syntax from a predefined vocabulary. Such a vocabulary may include a nouns corresponding to an object (e.g., "fence"), prepositions referring to the geometric, relational or other properties e.g., "along", "near", and "slowly", verbs referring to the outcome of object tracking and other algorithms, and adjectives and adverbs referring to the properties of objects and dynamics in the scene. An example of a rule in graphical form is accepting input from a user drawing an arrow on a site map or another still image, where the characteristics of the arrow indicate information about the object movement such as speed of movement and the direction of the arrow may indicate the direction of the movement. For example, an arrow drawn from a first end of a fence to the second end of the fence ending on a road may represent a movement of an object crossing the fence and moving to the road. Each rule may be labeled according to the set of events that the rule is described.

According to some embodiments, a user may define the type of events need to be detected by the system using predefined natural language words, terms or phrases that may be collected into sentences. The user may define the events on the site map by, for example, marking an arrow, on a site map which may be applied to all the cameras or to a plurality of cameras. According to embodiments of the invention, a setting (e.g., a rule) may be applied to a plurality of cameras without the need to apply to each camera separately. For example, marking by an arrow an event of crossing a fence near a road may be applied to a plurality of cameras without the need to set each camera although the location of the fence and road and their alignment may vary it may be set automatically by the system. For example, a user may define a suspicious event (or a definition of the event) by the sentence "a slow movement near the fence". All words (except for articles and other functional words such as "a" and "the") in the previous example sentence are predefined words which are saved in one or more predefined databases of vocabularies. According to embodiments of the invention the rules setting process may use one or more of the predefined words which were given as labels during first segmentation stage (box 311).

Figure 6:
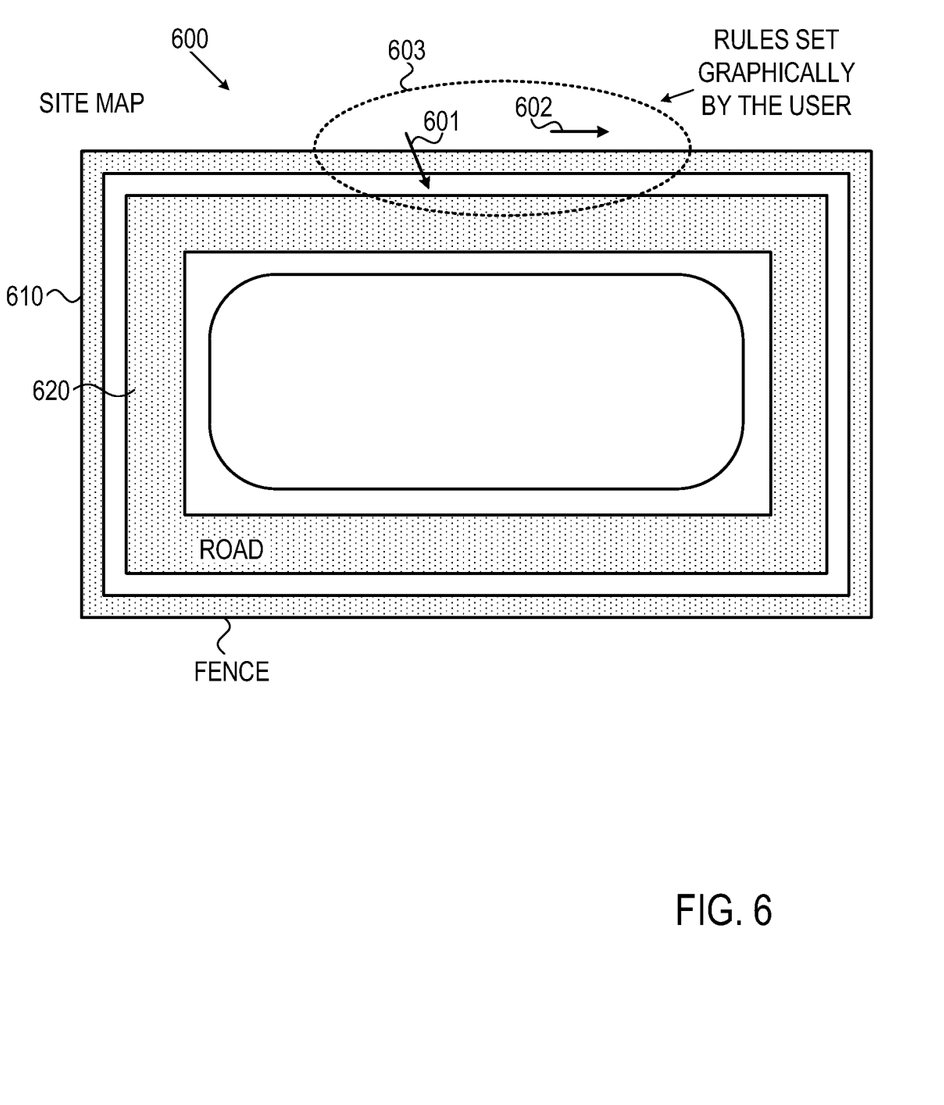
FIG. 6 is an exemplary site map demonstrating rule creation according to embodiments of the invention.

Reference is made to FIG. 6 which is an exemplary site map demonstrating rule setting or creation according to embodiments of the invention. Defining or setting rules may include graphically describing an event need to be detected using a site map as shown by FIG. 6. Site map 600 may include a fence 610 and a road 620. A user may graphically define rules by setting or creating graphic indications such as arrows 601 and 602 at a certain area 603. Indication 601 may be interpreted by the computing device as "objects crossing fence 610 towards road 620" and indication 602 may be interpreted as "objects moving along fence 610". The rules may be created by a user using one or more input devices such as a mouse a keyboard a touch screen and the like.

According to embodiments of the invention, in a certain monitored scene, a plurality of possible rules and events may be defined and categorized during rules defining stage (box 314) according to their severity. For example, events may be categorized as "normal-event", "critical-event", or "suspicious event". Each category may be set to produce or generate a predefined trigger, for example, a critical event may generate an alarm while suspicious event may cause information on the event to be passed to a user.

Figure 7:
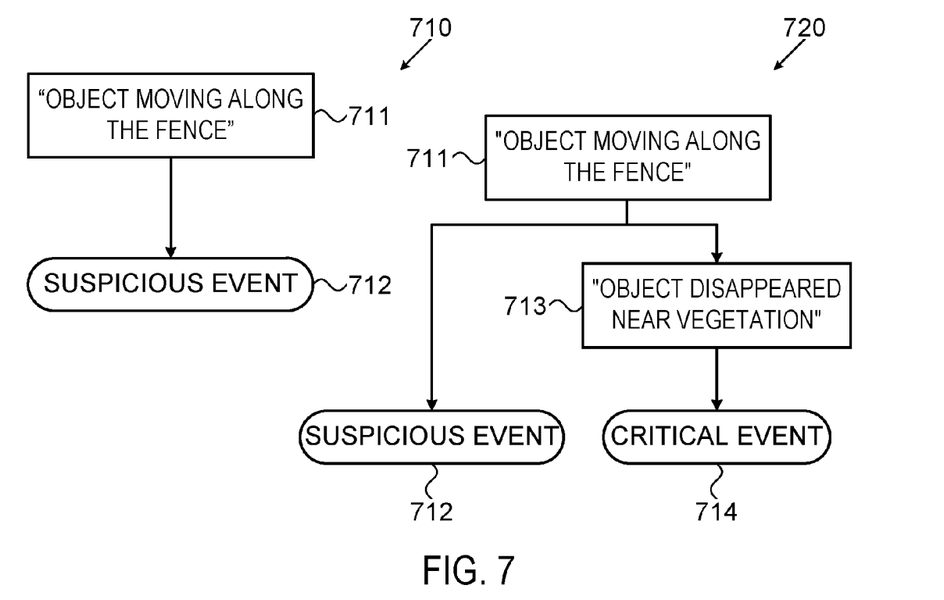
FIG. 7 is an exemplary tree-like structure of conditional severities according to embodiments of the invention.

Other embodiments of the invention may include a complex setup which may be obtained by conditioning the severity of one event on the occurrence of another event as demonstrated by FIG. 7.

Reference is made to FIG. 7 which is an exemplary tree-like structure of conditional severities according to embodiments of the invention. An event may be defined as a certain event, e.g., "normal" but if it occurs after another event, its definition, importance or severity may be changed into another category, e.g., into "critical". For example, as represent by flowchart 710, the event "an object moving along the fence" 711 may be defined as suspicious event 712, however, as shown by flowchart 720, the same event 711 followed by another event such as "an object disappeared near vegetation" 713 may be assigned a different severity, e.g., critical event 714.

In another example, an event such as "an object disappeared near vegetation" may be of low or negligible severity when identified without certain previous events having occurred; however, if the object initially approached the fence in a perimeter intrusion detection scenario and then disappeared near the fence, it may be necessary to alert the user about this event as shown by flowchart 720 of FIG. 7. Conditioning the severity of one event on the occurrence of another event may be set using a tree-like structure or in any other graphical structure.

Referring back to FIG. 3, during a rules and events identification stage indicated at box 315, an identification process may take place in order to identify and learn the structure and the characteristics of the rules defined during rules defining stage (box 314). During this stage the defined rules and events may be checked and the relations between rules and events may be identified such as to enable identification of redundant rules and/or discrepancies between rules and events and to allow automatic rules definition as described at box 316.

Figure 8:
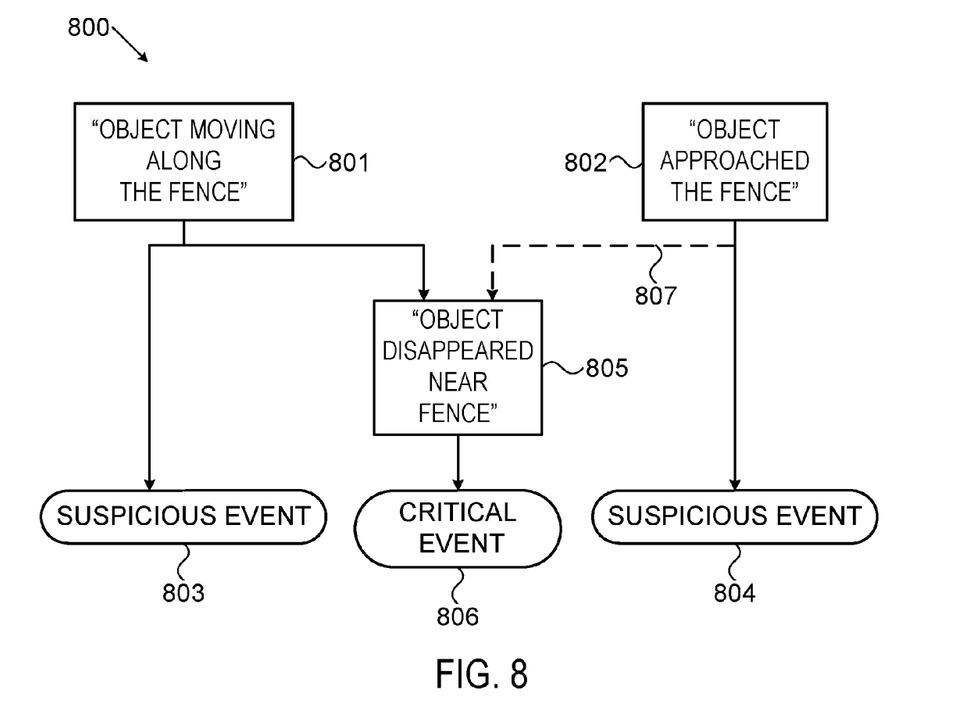
FIG. 8 is an exemplary tree-like structure of rules suggestion according to embodiments of the invention.

As indicated at box 316, an automatic setup stage may be performed during which additional rules for alerts based on the rules already defined may be suggested to the user. The additional suggested rules may be based on previously defined rules. An example for a suggested rule is presented by FIG. 8, which is an exemplary tree-like structure of rules suggestion according to embodiments of the invention. Based on the rules and events previously defined (box 314) and based on their characteristics previously identified (box 315), similar events and rules may be suggested. For example, as represent by flowchart 800, since events "object moving along the fence" 801 and "object approaching the fence" 802 are both defined as suspicious events as shown by boxes 803 and 804, the object labeled as "fence" may be identified as an important area during rules identification stage 315. Since an event such as "object disappeared near fence" 805 following an event such as "object moving along the fence" 801 leads to "a critical event" 806, it may be suggested to the user that the event of "object disappear near fence" 805 following the event "object approached fence" 802 may also lead to "a critical event" 806 as demonstrated by adding arrow 807 to tree-like structure 800. An evaluation of the level of similarity of a plurality of rules or events by comparing parts of the phrases and their trigger level may be performed. In this example, the verbs "moving" and "approaching" are the only difference between the rules and if these two verbs are predefined as similar, the two rules may be considered similar. The predefined similarity between words, terms or phrases may be saved in a database and may be used to measure similarities between predefined rules.

According to some embodiments of the invention during automatic setup stage 316, rules and events defined for one or more channels may be automatically applied to other channels which were not defined during rules defining stage (box 314).

As described with reference to FIG. 3, setup process 310 may include the setup process described in boxes 311, 312 and 313 and a rules defining process described in boxes 314, 315 and 316. During setup process 310 a plurality of predefined words or predefined vocabularies may be used. According to embodiments of the invention, the predefined words may be divided into a plurality of groups or databases and indexed according to semantic similarity. The predefined words may also be saved in such a way in order to allow a quicker and easier orientation of a user. The plurality of predefined words may be classified or sorted into a variety of groups in order to help a user to find a desirable word easily. For example, the predefined words may be sorted by elements of speech, e.g., nouns, verbs, adjectives. A predefined database of nouns may include nouns corresponding to objects such as "road", "fence", "tree" and the like. A predefined database of prepositions may refer to the relationship between two words and may include words such as "along", "near", and "on" and the like. A predefined database of verbs may include verbs refer to actions or states such as "move", "cross" and the like. A predefined database of adjectives and adverbs may refer to properties of objects and dynamics in the scene and may include words such as "quickly", "slowly", "big", "large" and the like. It should be understood that the predefined vocabularies or databases may be used during the setup process (boxes 311, 312 and 313) and the rules defining process (boxes 314, 315 and 316).

Referring to FIG. 3, setup process 310 may be followed by an application process 320 which may include conversion of the description of a monitored scene into video characterization parameters as indicated at box 321. According to some embodiments, the process of conversion may further include conversion of a set of rules and events defined by a plurality of intuitive predefined words into video characterization parameters. An application server, e.g., application server 103 of FIG. 1 may receive from a workstation, e.g., workstation 101 of FIG. 1, a semantic setup. A video analytics application executed by a computing device, e.g., application server 103 of FIG. 1, may convert the description of the monitored scene and a plurality of rules related to the monitored scene into video characterization parameters suitable for or required by the computer vision algorithms executed during analysis indicated at box 322. Exemplary computer vision algorithms may include, but are not limited to, preprocessing algorithms, object detection and tracking algorithms and scene characterization algorithms.

According to embodiments of the invention, a description of a monitored scene may include the segmented objects, e.g., boundaries and skeletons of objects such as a fence and a road in a still image or a site map, along with their labels e.g., "fence", "road". By segmenting and marking the object in a still image a user may describe the monitored scene as he sees it in intuitive manner and may provide a semantic interpretation.

The conversion of the semantic setup (scene description and rules defined) may correspond or be according to, or may be tailored to, to the specific computer vision algorithms being used, e.g., each computer vision algorithm may require a different set of system parameters or video characterization parameters. For example, preprocessing algorithms may model the background of the monitored scene and may provide a foreground and/or background mapping for an object tracking algorithms. Conversion of the semantic setup into video characterization parameters may include extraction of properties of each segment of the image. The properties may include probability distribution of characteristics of a segment such as edges or color of pixels. Other examples may include static properties such as, boundaries, texture and color information, as well as dynamic properties such as the expected variations over time in color, illumination and texture. For example, segments labeled as "vegetation" are expected to be non-stationary as vegetation is prone to move due to weather conditions such as rain or wind. Converting scene description and rules into video characterization parameters required by preprocessing algorithms may include, for example, calculating of statistical values such as mean and standard deviation values for pixels luminance of each object in the background of the image.

Another exemplary computer vision algorithm is an object detection and tracking algorithm which may detect objects and may track them in the scene. In this case, the semantic setup may be converted into three-dimensional orientations of segments in the scene thereby reducing the number of hypotheses of object locations and trajectories to be considered. For example, object detection algorithms may expect objects to be partially occluded near vegetation, non-occluded on the road, and have deformations while climbing fences. Moreover, segments marked as fences or walls are generally vertical and perpendicular to a road segment. Such information may be used by the object tracker algorithm, for example, to discard hypotheses of fast movement through a fence or a wall.

Exemplary video characterization parameters converted from scene description and required by object detection and tracking algorithm may include, coordinates in which a foreground object may exist, three-dimensional information such as angles between objects, typical object sizes and spatial location of background objects.

Another exemplary computer vision algorithm is a scene characterization algorithm which may analyze the trajectories of objects and may generate flags according to interactions of objects with each other and with background areas. For example, if an object walks in an area defined as "road", a proper flag may be set. The system parameters generated or converted from the semantic setup may be the areas of interest and the interactions needed to be monitored.

As indicated at box 322, an analysis of the video data received from a plurality of cameras located at the monitored scene and saved by a data server may be performed by execution of a plurality of computer vision algorithms based on the video characterization parameters. By executing one or more computer vision algorithms the video data of the monitored scene may be analyzed in order to identify the events and rules previously defined. The analysis of the video data may be based on and make use of the video characterization parameters generated at box 321.

During analysis certain areas may be identified as crucial areas for analysis based on rules and events defined at box 314. For example, reference is made to FIG. 6. If the rules defined involve road 620 and fence 610, an object detection and tracking algorithm may be executed only on the road 620, fence 610 and the gap between them. Other areas, far from these areas may not be analyzed. This allows using system resources in a more efficient way. In addition, the rules may be used to identify the type of objects and motion expected to be found in a scene.

As indicated at box 323, based on the output of the computer vision algorithms identification of defined events and broken rules may be performed. For example, preprocessing algorithm may provide information regarding changes and variation of properties of labeled segments over time. This may include indications about illumination changes and movements of background objects. Such information may be used to evaluate the uncertainty of detected events. For example, if an object was identified walking or moving from the fence and disappearing near vegetation and then reappearing on the road the algorithm may consider it as two different objects (one that disappears and one that appears) then information about variation in the texture of the vegetation present in the assumed trajectory of the object may increase the certainty that this may be the same object. Another example, a road which may suffer from rapid illumination changes due to clouds casting shadows, may increase the uncertainty regarding any objects identified on the road.

In another example, object detection and tracking algorithm may provide information about how objects move between labeled segments. For example, an object is moving fast along the road and away from the fence. In addition, the object detection algorithm may provide properties of the object such as large, small, and the like. This information may be linked to adverbs, adjectives, and prepositions used by the user to define rules for analysis and therefore may assist in identifying events. Scene characterization algorithm may provide information regarding relations between objects, for example, an object present on the road. Such information may be linked to nouns and verbs used by the user to define rules for analysis and therefore may assist in identifying events.

As indicated at box 324 the results of the analysis described with system parameters may be converted from system parameters into intuitive language using one or more words from the plurality of predefined words which were used during setup process 310. The results of the analysis may be displayed to the user using one or more words from the plurality of predefined words. Defining the required analysis using natural language may allow producing alerts and insights to the user using the same natural-language vocabulary used to setup the system. This may provide a user of the video analytics system an information cycle in natural intuitive language.

It should be understood to a person skilled in the art that other operations or sets of operations may be used in accordance with embodiments of the invention.

Usually video analytics systems involve setting many of the parameters for each channel separately and independently. This may be time consuming and may cause user errors. Embodiments of the invention make use of the fact that channels of the same system may share similar properties and save time and errors during multiple channels configuration. For example, in a perimeter protection system, almost all the channels include a fence (or some boundary) and share similar lighting conditions.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for semantics based video analysis, the method comprising:
   accepting a textual description of a monitored scene, the textual description comprising one or more textual terms selected by a user from a plurality of predefined textual terms;
   accepting a plurality of rules related to the monitored scene, the rules comprising one or more textual terms from the plurality of predefined textual terms;
   converting the textual description of the monitored scene into video characterization parameters;
   receiving video data from a plurality of cameras located at the monitored scene;
   performing video analysis of the video data based on the video characterization parameters and the rules;
   converting results of the video analysis into one or more alerts selected from a plurality of predefined alerts; and
   issuing the one or more alerts.

2. The method of claim 1, further comprising:
   receiving an image of the monitored scene divided into a plurality of segments.

3. The method of claim 2, wherein the plurality of segments are labeled by the one or more textual terms selected by the user to describe the monitored scene.

4. The method of claim 1, wherein the plurality of rules related to the monitored scene comprises a plurality of events to be detected.

5. The method of claim 1, wherein performing the analysis of the video data comprises executing a plurality of computer vision algorithms.

6. The method of claim 4, wherein the analysis of the video data comprises identifying the events.

7. The method of claim 1, further comprising:

converting the plurality of rules into video characterization parameters.

8. The method of claim 2, further comprising:
identifying characteristics of the plurality of segments and refining the plurality of segments based on the characteristics.

9. The method of claim 8, wherein identifying characteristics of the plurality of segments of a first video channel is used to generate a description of a monitored scene of a second video channel.

10. The method of claim 1, further comprising:
identifying characteristics of the plurality of rules and automatically suggest other rules based on the characteristics.

11. A video analytics system comprising:
a workstation to accept a textual description of a monitored scene from a user and a plurality of rules related to the scene, the textual description and the rules comprising one or more textual terms selected by a user from a plurality of predefined textual terms;
a computing device to convert the textual description of the monitored scene into video characterization parameters; and
a data server to save video data recorded by a plurality of cameras, to receive the video characterization parameters and to perform an analysis of the video data based on the video characterization parameters and the rules;
wherein the computing device is to convert results of the analysis into one or more alerts selected from a plurality of predefined alerts to be presented to the user by the workstation.

12. The system of claim 11, wherein the computing device is to receive an image of the monitored scene that comprises a plurality of segments of the monitored scene.

13. The system of claim 12, wherein each of the plurality of segments is labeled with the one or more textual terms selected by the user to describe the monitored scene.

14. The system of claim 11, wherein the plurality of rules related to the monitored scene comprises a plurality of events to be detected.

15. The system of claim 11, wherein the analysis of the video data comprises execution of a plurality of computer vision algorithms.

16. The system of claim 14, wherein the analysis of the video data comprises identifying the events.

17. The system of claim 11, wherein the computing device is to convert the plurality of rules into video characterization parameters.

18. An article comprising a non-transitory computer-readable storage medium, having stored thereon instructions, that when executed on a computer, cause the computer to:
accept a textual description of a monitored scene, the description comprising one or more textual terms selected by a user from a plurality of predefined textual terms;
accept a plurality of rules related to the monitored scene, the rules comprising one or more textual terms from the plurality of predefined textual terms;
convert the textual description of the monitored scene into video characterization parameters;
receive video data from a plurality of cameras located at the monitored scene;
perform video analysis of the video data based on the video characterization parameters and the rules;
convert results of the video analysis into one or more alerts selected from a plurality of predefined alerts; and
issue the one or more alerts.

* * * * *